(12) United States Patent
Khan et al.

(10) Patent No.: US 8,055,897 B2
(45) Date of Patent: Nov. 8, 2011

(54) DIGITAL OBJECT TITLE AND TRANSMISSION INFORMATION

(75) Inventors: Shabbir Khan, San Jose, CA (US); Alexander Cohen, Mill Valley, CA (US)

(73) Assignee: Lippershy Celestial LLC, Las Vegas, NV (US)

( * ) Notice: Subject to any disclaimer, the term of this patent is extended or adjusted under 35 U.S.C. 154(b) by 1309 days.

(21) Appl. No.: 11/296,601

(22) Filed: Dec. 6, 2005

(65) Prior Publication Data

US 2007/0133710 A1 Jun. 14, 2007

(51) Int. Cl.
G06F 9/00 (2006.01)
H04L 29/06 (2006.01)

(52) U.S. Cl. ............ 713/160; 713/1; 713/152; 713/167; 726/13; 726/14

(58) Field of Classification Search .................. 713/189, 713/1, 152, 160, 167; 726/13, 14
See application file for complete search history.

(56) References Cited

U.S. PATENT DOCUMENTS

| | | |
|---|---|---|
| 4,041,398 A | 8/1977 | Ellis |
| 4,339,807 A | 7/1982 | Uchimura et al. |
| 4,405,829 A | 9/1983 | Rivest et al. |
| 4,462,473 A | 7/1984 | Valestin |
| 4,668,758 A | 5/1987 | Corley |
| 4,827,508 A | 5/1989 | Shear |
| 4,829,443 A | 5/1989 | Pintsov et al. |
| 4,868,758 A | 9/1989 | Kokubu |
| 4,885,777 A | 12/1989 | Takaragi et al. |
| 4,959,795 A | 9/1990 | Christensen et al. |
| 4,975,830 A | 12/1990 | Gerpheide et al. |
| 4,977,594 A | 12/1990 | Shear |
| 4,995,081 A | 2/1991 | Leighton et al. |
| 4,995,082 A | 2/1991 | Schnorr |
| 5,050,213 A | 9/1991 | Shear |
| 5,101,437 A | 3/1992 | Plamondon |
| 5,111,512 A | 5/1992 | Fan et al. |
| 5,195,133 A | 3/1993 | Kapp et al. |
| 5,202,930 A | 4/1993 | Livshitz et al. |
| 5,203,263 A | 4/1993 | Berger et al. |
| 5,222,138 A | 6/1993 | Balabon et al. |
| 5,280,527 A | 1/1994 | Gullman et al. |
| 5,337,358 A | 8/1994 | Axelrod et al. |
| 5,359,508 A | 10/1994 | Rossides |
| 5,383,129 A | 1/1995 | Farrell |
| 5,386,369 A | 1/1995 | Christiano |
| 5,410,598 A | 4/1995 | Shear |
| 5,434,928 A | 7/1995 | Wagner et al. |
| 5,465,299 A | 11/1995 | Matsumoto et al. |
| 5,487,100 A | 1/1996 | Kane |
| 5,490,217 A | 2/1996 | Wang et al. |
| 5,557,320 A | 9/1996 | Krebs |
| 5,592,477 A | 1/1997 | Farris et al. |

(Continued)

FOREIGN PATENT DOCUMENTS

CN 1650578 8/2005

(Continued)

OTHER PUBLICATIONS

Search Report—Written Opinion issued Aug. 28, 2008 for PCT/US07/61697, 7 pages.

(Continued)

*Primary Examiner* — Mohammad W Reza

(57) ABSTRACT

Embodiments for generating digital title and transmission information are disclosed.

44 Claims, 7 Drawing Sheets

U.S. PATENT DOCUMENTS

| | | | |
|---|---|---|---|
| 5,677,905 A | 10/1997 | Bigham et al. | |
| 5,719,942 A | 2/1998 | Aldred et al. | |
| 5,727,156 A | 3/1998 | Herr-Hoyman et al. | |
| 5,790,642 A | 8/1998 | Taylor et al. | |
| 5,801,753 A * | 9/1998 | Eyer et al. | 725/50 |
| 5,838,920 A | 11/1998 | Rosborough | |
| 5,854,897 A | 12/1998 | Radziewicz et al. | |
| 5,909,595 A * | 6/1999 | Rosenthal et al. | 710/38 |
| 5,995,503 A | 11/1999 | Crawley et al. | |
| 6,006,264 A | 12/1999 | Colby et al. | |
| 6,044,075 A | 3/2000 | Le Boudec et al. | |
| 6,047,313 A | 4/2000 | Hashimoto et al. | |
| 6,073,176 A | 6/2000 | Baindur et al. | |
| 6,073,716 A | 6/2000 | Ellertson et al. | |
| 6,081,591 A | 6/2000 | Skoog | |
| 6,134,589 A | 10/2000 | Hultgren | |
| 6,141,325 A | 10/2000 | Gerstel | |
| 6,157,648 A | 12/2000 | Voit et al. | |
| 6,163,807 A | 12/2000 | Hodgkinson et al. | |
| 6,199,054 B1 | 3/2001 | Khan et al. | |
| 6,289,371 B1 | 9/2001 | Kumpf et al. | |
| 6,314,093 B1 | 11/2001 | Mann et al. | |
| 6,366,575 B1 | 4/2002 | Barkan et al. | |
| 6,400,681 B1 | 6/2002 | Bertin et al. | |
| 6,400,687 B1 | 6/2002 | Davison et al. | |
| 6,426,948 B1 | 7/2002 | Bowman-Amuah | |
| 6,487,172 B1 | 11/2002 | Zonoun | |
| 6,522,735 B1 | 2/2003 | Fortman et al. | |
| 6,529,958 B1 | 3/2003 | Oba et al. | |
| 6,538,991 B1 | 3/2003 | Kodialam et al. | |
| 6,563,793 B1 | 5/2003 | Golden et al. | |
| 6,580,721 B1 | 6/2003 | Beshai | |
| 6,631,132 B1 * | 10/2003 | Sourani | 370/389 |
| 6,683,874 B1 | 1/2004 | Nagami et al. | |
| 6,687,230 B1 | 2/2004 | Furutono et al. | |
| 6,687,247 B1 * | 2/2004 | Wilford et al. | 370/392 |
| 6,765,921 B1 | 7/2004 | Stacey et al. | |
| 6,778,493 B1 | 8/2004 | Ishii | |
| 6,901,445 B2 | 5/2005 | McCanne et al. | |
| 6,947,390 B2 | 9/2005 | Hundscheidt et al. | |
| 6,954,435 B2 | 10/2005 | Billhartz et al. | |
| 6,970,939 B2 | 11/2005 | Sim | |
| 6,973,057 B1 | 12/2005 | Forslow | |
| 6,975,594 B1 | 12/2005 | Byers | |
| 6,977,930 B1 * | 12/2005 | Epps et al. | 370/392 |
| 6,981,029 B1 | 12/2005 | Menditto et al. | |
| 6,981,032 B2 | 12/2005 | Boivie et al. | |
| 6,985,960 B2 | 1/2006 | Takashima et al. | |
| 7,068,600 B2 | 6/2006 | Cain | |
| 7,079,538 B2 * | 7/2006 | Gazsi et al. | 370/392 |
| 7,162,539 B2 | 1/2007 | Garcie-Luna-Aceves | |
| 7,164,665 B2 * | 1/2007 | Tourunen | 370/329 |
| 7,177,832 B1 | 2/2007 | Semret et al. | |
| 7,206,850 B2 | 4/2007 | Ogawa | |
| 7,212,975 B2 | 5/2007 | Bantz et a | |
| 7,260,598 B1 | 8/2007 | Liskov et al. | |
| 7,269,185 B2 | 9/2007 | Kirkby et al. | |
| 7,289,817 B2 | 10/2007 | Chun | |
| 7,336,663 B2 | 2/2008 | Sakai | |
| 7,415,268 B2 | 8/2008 | Trossen | |
| 7,418,518 B2 | 8/2008 | Grove et al. | |
| 7,472,274 B2 | 12/2008 | Moreaux et al. | |
| 7,526,646 B2 | 4/2009 | Fukuda et al. | |
| 7,558,859 B2 | 7/2009 | Kasiolas et al. | |
| 7,616,661 B2 * | 11/2009 | Park et al. | 370/474 |
| 7,734,730 B2 | 6/2010 | McCanne | |
| 2001/0025310 A1 | 9/2001 | Krishnamurthy et al. | |
| 2001/0027449 A1 | 10/2001 | Wright | |
| 2001/0029479 A1 | 10/2001 | Watanabe | |
| 2001/0049730 A1 | 12/2001 | Brendes et al. | |
| 2001/0053693 A1 | 12/2001 | Achour et al. | |
| 2001/0053696 A1 | 12/2001 | Pillai et al. | |
| 2002/0002602 A1 | 1/2002 | Vange et al. | |
| 2002/0004843 A1 | 1/2002 | Andersson et al. | |
| 2002/0015386 A1 | 2/2002 | Kajiwara | |
| 2002/0048483 A1 | 4/2002 | Altonen et al. | |
| 2002/0059624 A1 | 5/2002 | Machida et al. | |
| 2002/0059625 A1 | 5/2002 | Kurauchi | |
| 2002/0064149 A1 | 5/2002 | Elliott et al. | |
| 2002/0069179 A1 | 6/2002 | Slater et al. | |
| 2002/0071389 A1 | 6/2002 | Seo | |
| 2002/0124111 A1 | 9/2002 | Desai et al. | |
| 2002/0150041 A1 | 10/2002 | Reinshmidt et al. | |
| 2002/0180781 A1 | 12/2002 | Cezeaux et al. | |
| 2002/0188562 A1 | 12/2002 | Igarashi et al. | |
| 2002/0196461 A1 * | 12/2002 | Hanna et al. | 358/1.15 |
| 2003/0005049 A1 | 1/2003 | Ogawa | |
| 2003/0005148 A1 | 1/2003 | Mochizuki et al. | |
| 2003/0016679 A1 | 1/2003 | Adams et al. | |
| 2003/0018539 A1 | 1/2003 | La Poutre et al. | |
| 2003/0036970 A1 | 2/2003 | Brustoloni | |
| 2003/0059762 A1 | 3/2003 | Fujiwara et al. | |
| 2003/0093520 A1 | 5/2003 | Beesley | |
| 2003/0105960 A1 | 6/2003 | Takatori et al. | |
| 2003/0140144 A1 | 7/2003 | Raguram et al. | |
| 2003/0200439 A1 | 10/2003 | Moskowitz | |
| 2003/0202469 A1 | 10/2003 | Cain | |
| 2003/0210686 A1 | 11/2003 | Terrell et al. | |
| 2003/0212827 A1 * | 11/2003 | Saha et al. | 709/247 |
| 2004/0008689 A1 | 1/2004 | Westphal et al. | |
| 2004/0019901 A1 * | 1/2004 | Spio | 725/25 |
| 2004/0032856 A1 | 2/2004 | Sandstrom | |
| 2004/0052259 A1 * | 3/2004 | Garcia et al. | 370/392 |
| 2004/0064692 A1 | 4/2004 | Kahn et al. | |
| 2004/0105446 A1 | 6/2004 | Park et al. | |
| 2004/0111308 A1 | 6/2004 | Yakov | |
| 2004/0114605 A1 | 6/2004 | Karaoguz et al. | |
| 2004/0172373 A1 | 9/2004 | Chen | |
| 2004/0192324 A1 | 9/2004 | Rudkin | |
| 2004/0199472 A1 | 10/2004 | Dobbins | |
| 2004/0213224 A1 | 10/2004 | Goudreau | |
| 2004/0236957 A1 | 11/2004 | Durand et al. | |
| 2004/0246372 A1 * | 12/2004 | Megeid | 348/384.1 |
| 2004/0261116 A1 | 12/2004 | Mckeown et al. | |
| 2005/0002354 A1 | 1/2005 | Kelly et al. | |
| 2005/0037787 A1 | 2/2005 | Bachner et al. | |
| 2005/0038707 A1 | 2/2005 | Roever et al. | |
| 2005/0038724 A1 | 2/2005 | Roever et al. | |
| 2005/0044016 A1 | 2/2005 | Irwin et al. | |
| 2005/0135234 A1 | 6/2005 | Saleh et al. | |
| 2005/0135379 A1 | 6/2005 | Callaway et al. | |
| 2005/0152355 A1 * | 7/2005 | Henriques | 370/389 |
| 2005/0152378 A1 | 7/2005 | Bango et al. | |
| 2005/0169270 A1 | 8/2005 | Mutou et al. | |
| 2005/0193114 A1 | 9/2005 | Colby et al. | |
| 2005/0195842 A1 | 9/2005 | Dowling | |
| 2005/0197098 A1 | 9/2005 | Trossen | |
| 2005/0201380 A1 | 9/2005 | Saleh et al. | |
| 2005/0204042 A1 | 9/2005 | Banerjee et al. | |
| 2005/0209927 A1 | 9/2005 | Aaltonen et al. | |
| 2005/0234860 A1 | 10/2005 | Roever et al. | |
| 2005/0246193 A1 | 11/2005 | Roever et al. | |
| 2006/0002406 A1 | 1/2006 | Ishihara et al. | |
| 2006/0059253 A1 | 3/2006 | Goodman et al. | |
| 2006/0140162 A1 | 6/2006 | Vasa | |
| 2006/0195565 A1 | 8/2006 | De-Poorter | |
| 2007/0058568 A1 | 3/2007 | Previdi et al. | |
| 2007/0061891 A1 | 3/2007 | Suzuki et al. | |
| 2007/0127372 A1 | 6/2007 | Khan et al. | |
| 2007/0130046 A1 | 6/2007 | Khan et al. | |
| 2007/0133553 A1 | 6/2007 | Kahn et al. | |
| 2007/0133570 A1 | 6/2007 | Khan et al. | |
| 2007/0133571 A1 | 6/2007 | Kahn et al. | |
| 2007/0133710 A1 | 6/2007 | Khan et al. | |
| 2007/0136209 A1 | 6/2007 | Khan et al. | |
| 2007/0192872 A1 | 8/2007 | Rhoads et al. | |
| 2007/0291773 A1 | 12/2007 | Khan et al. | |

FOREIGN PATENT DOCUMENTS

| | | |
|---|---|---|
| EP | 0982901 | 3/2000 |
| EP | 1187505 | 3/2002 |
| EP | 1513301 | 3/2005 |
| GB | 2399257 | 9/2004 |
| GB | 2411549 | 8/2005 |
| JP | 5-344135 | 12/1993 |
| JP | 2000-500308 | 1/2000 |
| JP | 2000-059377 | 2/2000 |

| | | |
|---|---|---|
| JP | 2001-077856 | 3/2001 |
| JP | 2001-282619 | 10/2001 |
| JP | 2002-261800 | 9/2002 |
| JP | 2002-261805 | 9/2002 |
| JP | 2003-122726 | 4/2003 |
| JP | 2003-209568 | 7/2003 |
| JP | 2004-140486 | 5/2004 |
| JP | 2004-159296 | 6/2004 |
| JP | 2004-266547 | 9/2004 |
| JP | 2004-341929 | 12/2004 |
| JP | 2005-150955 | 6/2005 |
| JP | 2005-222523 | 8/2005 |
| KR | 2000-4564 | 1/2000 |
| KR | 2001-16690 | 3/2001 |
| KR | 2005-17108 | 2/2005 |
| WO | 9618939 | 6/1996 |
| WO | 00/10357 | 2/2000 |
| WO | 00/45560 | 8/2000 |
| WO | 2004006486 | 1/2004 |
| WO | 2005-004518 | 1/2005 |
| WO | 2007/067911 | 6/2007 |
| WO | 2007/067913 | 6/2007 |
| WO | 2007/067915 | 6/2007 |
| WO | 2007/067917 | 6/2007 |
| WO | 2007/067930 | 6/2007 |
| WO | 2007/067933 | 6/2007 |
| WO | 2007/067934 | 6/2007 |
| WO | 2008/078149 | 7/2008 |

OTHER PUBLICATIONS

International Preliminary Report on Patentability issued Sep. 3, 2008 for PCT/US07/61697, 5 pages.
Search Report—Written Opinion issued Oct. 11, 2007 for PCT/US06/61701, 9 pages.
International Preliminary Report on Patentability issued Jun. 11, 2008 for PCT/US06/61701, 5 pages.
Search Report—Written Opinion issued Oct. 16, 2007 for PCT/US06/61702, 9 pages.
International Preliminary Report on Patentability issued Jun. 11, 2008 for PCT/US06/61702, 7 pages.
Search Report—Written Opinion issued Oct. 16, 2007 for PCT/US06/61650, 9 pages.
International Preliminary Report on Patentability issued Jun. 11, 2008 for PCT/US06/61650, 7 pages.
Search Report—Written Opinion Issued on Mar. 20, 2008 for PCT/US06/61653, 9 pages.
International Preliminary Report on Patentability issued Jul. 8, 2008 for PCT/US06/61653, 6 pages.
International Preliminary Report on Patentability issued Jun. 11, 2008 for PCT/US06/61657, 5 pages.
Search Report—Written Opinion issued on Jul. 7, 2008 for PCT/IB06/004281, 9 pages.
International Preliminary Report on Patentability issued Jul. 29, 2008 for PCT/IB06/004281, 7 pages.
Search Report—Written Opinion issued on Aug. 8, 2008 PCT/US06/61660, 7 pages.
International Preliminary Report on Patentability issued Oct. 28, 2008 for PCT/US06/61660, 4 pages.
Office Action for U.S. Appl. No. 11/296,819 mailed Dec. 11, 2008, 10 pages.
Office Action for U.S. Appl. No. 11/296,011 mailed Jun. 20, 2008, 12 pages.
Response to Office Action of Jun. 20, 2008 for U.S. Appl. No. 11/296,011 mailed Sep. 22, 2008, 13 pages.
Office Action for U.S. Appl. No. 11/296,011 mailed Dec. 16, 2008, 12 pages.
Office Action for U.S. Appl. No. 11/295,769 mailed Oct. 3, 2008, 9 pages.
Response to Office Action of Oct. 3, 2008 for U.S. Appl. No. 11/295,769 mailed Jan. 5, 2009, 20 pages.
Office Action for U.S. Appl. No. 11/295,769 mailed Jan. 22, 2009, 12 pages.
Terms and conditions of the extended download warranty for digital products purchased on the Symantec Store, Jun. 27, 2005.
High Energy, by Tom Kaneshige, published on www.Line56.com on Oct. 17, 2001.
Multiprotocol Label Switching Architecture Memo, Copyright © The Internet Society (2001).
Notification of Transmittal of the International Search Report and the Written Opinion of the International Searching Authority, or the Declaration, mailed Nov. 15, 2007, cited in PCT Application No. PCT/US06/61657.
International Search Report for Application No. PCT/US06/61650, mailed Sep. 25, 2007, 3 pages.
International Search Report for Application No. PCT/US06/61659, mailed Jul. 7, 2008, 3 pages.
European Search Report for International Application No. PCT/US2006/061650, mailed Nov. 23, 2009, 2 pages.
International Search Report for Application No. PCT/US06/61653, mailed Mar. 20, 2008, 1 page.
International Search Report for Application No. PCT/US06/61657, mailed Nov. 15, 2007, 1 page.
International Preliminary Report on Patentability for Application No. PCT/US06/61657, mailed Jun. 19, 2008, 2 pages.
Knightson, et al., NGN Architecture: Generic Principles, Functional Architecture, and Implementation; Oct. 8, 2005; pp. 49-56.
International Search Report and Written Opinion in Application No. PCT/US2006/061657 dated Nov. 15, 2007, 7 pages.
International Preliminary Report in Application No. PCT/US2006/061657 dated Jun. 19, 2008, 2 pages.
Official Action in Chinese Application No. 200680045983.4 issued Jun. 10, 2010, 8 pages. English Translation Available.
Official Action in Korean Application No. 10-2008-7016280 issued Jun. 28, 2010, 6 pages. English Summary Available.
RFC 3031, 2001; IETF Networking Group, by E. Rosen et al.

* cited by examiner

Digital Title and Transmittal Form 500

| |
|---|
| Payload ID 510 |
| Assignee ID 520 |
| Proxy ID 530 |
| File Size 540 |
| File Type 550 |
| Handling Requirements 560 |
| Description 570 |
| Provenance 580 |

FIG. 5

DIGITAL OBJECT TITLE AND TRANSMISSION INFORMATION

FIELD

The subject matter disclosed herein relates to the distribution of digital objects in a data transmission network.

BACKGROUND

In the distribution of digital objects, information specifying rules for the decryption for encrypted objects and/or information establishing the right to use the digital objects in particular ways or by particular entities may be distributed along with or embedded in the digital objects. For example, an MP3 file may be executable as music by a computing platform. The MP3 file may be encrypted, and the rules for decrypting the MP3 file and/or the information establishing the right to play the music may be included as a digital envelope for the MP3 file. The rights and decryption information are therefore tightly coupled to the MP3 file. When relatively large digital objects, for example movie files, are transmitted over a network, significant resources such as computer time, disk cache, bandwidth, and electricity may be utilized. Because the rights and/or decryption information are tightly coupled to the digital objects, significant resources are utilized whenever the rights and decryption information are transmitted over a network.

BRIEF DESCRIPTION OF THE DRAWINGS

The claimed subject matter will be understood more fully from the detailed description given below and from the accompanying drawings of embodiments which should not be taken to limit the claimed subject matter to the specific embodiments described, but are for explanation and understanding only.

FIG. 5 is a diagram depicting an example embodiment of a digital title and transmission form.

DETAILED DESCRIPTION

Figure 1:
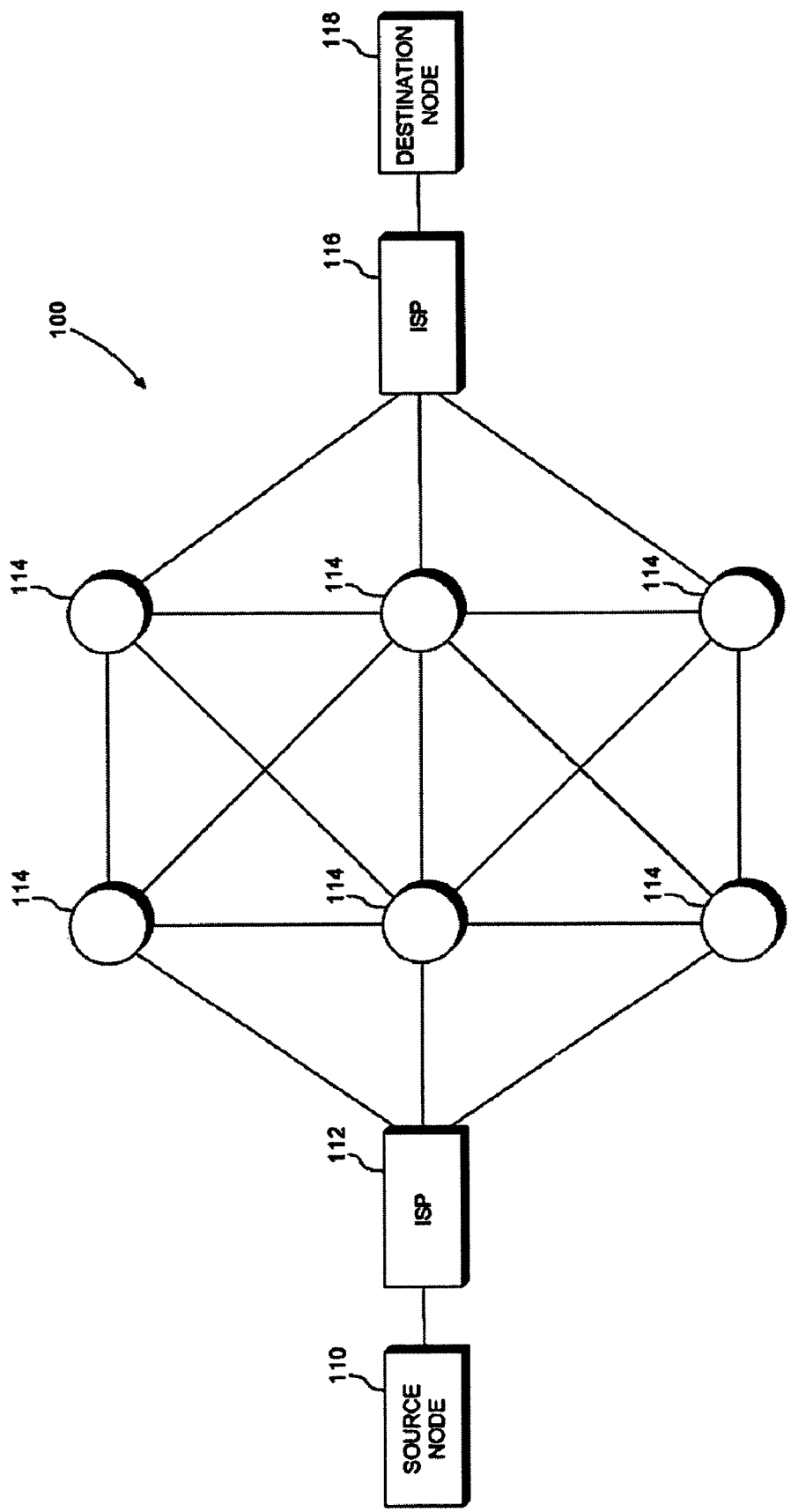
FIG. 1 is a block diagram of an example embodiment of a data transmission network.

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

Some portions of the detailed description that follows are presented in terms of algorithms, programs and/or symbolic representations of operations on data bits or binary digital signals within a computer memory, for example. These algorithmic descriptions and/or representations may include techniques used in the data processing arts to convey the arrangement of a computer system and/or other information handling system to operate according to such programs, algorithms, and/or symbolic representations of operations.

An algorithm may be generally considered to be a self-consistent sequence of acts and/or operations leading to a desired result. These include physical manipulations of physical quantities. Usually, though not necessarily, these quantities take the form of electrical and/or magnetic signals capable of being stored, transferred, combined, compared, and/or otherwise manipulated. It has proven convenient at times, principally for reasons of common usage, to refer to these signals as bits, values, elements, symbols, characters, terms, numbers and/or the like. It should be understood, however, that all of these and/or similar terms are to be associated with the appropriate physical quantities and are merely convenient labels applied to these quantities.

Unless specifically stated otherwise, as apparent from the following discussions, it is appreciated that throughout the specification discussion utilizing terms such as processing, computing, calculating, determining, and/or the like, refer to the action and/or processes of a computer and/or computing system, and/or similar electronic computing device, that manipulate or transform data represented as physical, such as electronic, quantities within the registers and/or memories of the computer and/or computing system and/or similar electronic and/or computing device into other data similarly represented as physical quantities within the memories, registers and/or other such information storage, transmission and/or display devices of the computing system and/or other information handling system.

Embodiments claimed may include apparatuses for performing the operations herein. This apparatus may be specially constructed for the desired purposes, or it may comprise a general purpose computing device selectively activated and/or reconfigured by a program stored in the device. Such a program may be stored on a storage medium, such as, but is not limited to, any type of disk including floppy disks, optical disks, CD-ROMs, magnetic-optical disks, read only memories (ROMs), random access memories (RAMs), electrically programmable read-only memories (EPROMs), electrically erasable and/or programmable read only memories (EEPROMs), flash memory, magnetic and/or optical cards, and/or any other type of media suitable for storing electronic instructions, and/or capable of being coupled to a system bus for a computing device and/or other information handling system.

The processes and/or displays presented herein are not inherently related to any particular computing device and/or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments are not described with reference to any particular programming language. It will be appreciated that a variety of programming languages may be used to implement the teachings described herein.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other.

It should be understood that certain embodiments may be used in a variety of applications. Although the claimed subject matter is not limited in this respect, the circuits disclosed herein may be used in many apparatuses such as in the transmitters and/or receivers of a radio system. Radio systems intended to be included within the scope of the claimed subject matter may include, by way of example only, wireless personal area networks (WPAN) such as a network in compliance with the WiMedia Alliance, a wireless local area networks (WLAN) devices and/or wireless wide area network (WWAN) devices including wireless network interface devices and/or network interface cards (NICs), base stations, access points (APs), gateways, bridges, hubs, cellular radiotelephone communication systems, satellite communication systems, two-way radio communication systems, one-way pagers, two-way pagers, personal communication systems (PCS), personal computers (PCs), personal digital assistants (PDAs), and/or the like, although the scope of the claimed subject matter is not limited in this respect.

Types of wireless communication systems intended to be within the scope of the claimed subject matter may include, although are not limited to, Wireless Local Area Network (WLAN), Wireless Wide Area Network (WWAN), Code Division Multiple Access (CDMA) cellular radiotelephone communication systems, Global System for Mobile Communications (GSM) cellular radiotelephone systems, North American Digital Cellular (NADC) cellular radiotelephone systems, Time Division Multiple Access (TDMA) systems, Extended-TDMA (E-TDMA) cellular radiotelephone systems, third generation (3G) systems like Wideband CDMA (WCDMA), CDMA-2000, and/or the like, although the scope of the claimed subject matter is not limited in this respect.

Reference throughout this specification to one embodiment or an embodiment means that a particular feature, structure, or characteristic described in connection with the embodiment is included in at least one embodiment. Thus, the appearances of the phrase in one embodiment or an embodiment in various places throughout this specification are not necessarily all referring to the same embodiment. Furthermore, the particular features, structures, or characteristics may be combined in one or more embodiments.

A network as referred to herein relates to infrastructure that is capable of transmitting data among nodes which are coupled to the network. For example, a network may comprise links capable of transmitting data between nodes according to one or more data transmission protocols. Such links may comprise one or more types of transmission media and/or links capable of transmitting information from a source to a destination. However, these are merely examples of a network, and the scope of the claimed subject matter is not limited in this respect.

In the transmission of data in a data transmission network, a source node may initiate transmission of data to one or more destination nodes coupled to the data transmission network. In one particular embodiment, although the scope of the claimed subject matter is not limited in this respect, a source node may initiate the transmission of data to the destination node based, at least in part, upon a destination address associated with the destination node. According to a communication protocol of a particular embodiment, the source node may transmit data to the destination node in one or more data packets which are routed to the destination node through the data transmission network based, at least in part, on the destination address. However, these are merely examples of how data may be transmitted from a source node to a destination node in a network, and the scope of the claimed subject matter is not limited in these respects.

A node in a network may forward information to one or more other nodes in the data transmission network over data links. In one particular example, a first node may forward information to a second node by transmitting one or more data packets according to a communication protocol. Such data packets may comprise a header portion containing an address of an intended destination node and a payload containing forwarded information. If the second node is not the ultimate intended destination, the second node may also forward the data packets to a third node which comprises and/or is coupled to the ultimate intended destination node. However, these merely examples of how information may be forwarded in a network, and the scope of the claimed subject matter is not limited in this respect.

A digital object as referred to herein relates to information that is organized and/or formatted in a digitized form. For example, a digital object may comprise one or more documents, visual media and/or audio media, and/or combinations thereof. However, these are merely examples of the types of information that may be maintained in a digital object, and the scope of the claimed subject matter is not limited in this respect. Such a digital object may be maintained in a compressed format to enable efficient storage of the digital object in a storage medium and/or transmission of the digital in a data transmission network. In other embodiments, such a digital object may be encrypted for transmission in a secure communication channel. In one particular embodiment, although the scope of the claimed subject matter is not limited in this respect, a digital object may be formatted at a source node for transmission to one or more destination nodes. Also, a digital object may be transmitted to one or more destination nodes as one or more data packets routed to the one or more data nodes according to a communication protocol. However, these are merely examples of a digital object, and the scope of the claimed subject matter is not limited in this respect. In one or more embodiments, a digital object may comprise a digital data payload as described in U.S. Pat. No. 6,199,054.

A bid as referred to herein relates to an expression of a proposal to perform a service. In one particular example, a customer and/or client may receive bids from more than one party competing for the business of the customer and/or client. A bid may specify terms under which a service may be performed such as, for example, price, quality, timeliness and/or reliability. However, these are merely examples of terms that may be expressed in a bid, and the scope of the claimed subject matter is not limited in this respect. Also, in some commercial contexts, acceptance of a bid by a customer and/or client may be binding on the parties. In other commercial contexts, however, acceptance of a bid by a customer and/or client, in and of itself, may not be binding. Here, additional actions by one or more parties may result in a binding arrangement. It should be understood that these are merely examples of a bid, and the scope of the claimed subject matter is not limited in this respect.

A bid request as referred to herein relates to an expression of an invitation to provide a bid for performing a service. In one particular example, such a bid request may specify a desired service to be performed by a service provider. In some embodiments, the bid request may specify some of the terms, but not necessarily all of the terms, under which a desired service is to be performed. However, these are merely examples of a bid request, and the scope of the claimed subject matter is not limited in this respect.

In response to receipt of a bid from a service provider for providing a service, a potential customer and/or client may provide an acceptance message to the bidding service provider. Such an acceptance message may express a willingness of the customer and/or client to receive services from the service provider according to at least some terms set forth in the received bid. However, this is merely an example of an acceptance message, and the scope of the claimed subject matter is not limited in this respect.

In forwarding a digital object from a source node to a destination node over a network, equipment which is owned, leased, controlled and/or operated by one or more intermediaries or intermediary parties may forward at least a portion of the digital object over at least a portion of the network toward the destination node. As illustrated below, the term intermediary may refer to a party that may forward a digital object over at least a portion of the data transmission network and/or equipment that is owned, leased, controlled and/or operated by the party for performing this service.

Equipment that is owned, leased, controlled and/or maintained by an intermediary may comprise equipment that is capable of transmitting information to and/or receiving information from a data transmission network. Here, such equipment may comprise one or more communication ports capable of receiving information from a source node and/or transmitting information to a destination node over one or more data transmission mediums forming links in the network. Such a communication port may be capable of transmitting and/or receiving information from any one of several types of media such as, for example, cabling which may include optical, coaxial, unshielded twisted wire pair cabling, and so on, and/or wireless transmission media which may include terrestrial wireless transmission links or non-terrestrial vehicle links such as atmospheric vehicles, aquatic vehicle, and/or space vehicles. However, these are merely examples of a communication port that may couple equipment which is owned, leased, controlled, and/or operated by an intermediary to a data transmission network, and the scope of the claimed subject matter is not limited in this respect.

Instructions as referred to herein relate to expressions which represent one or more logical operations. For example, instructions may be machine-readable by being interpretable by a machine for executing one or more operations on one or more data objects. However, this is merely an example of instructions, and the scope of claimed subject matter is not limited in this respect. In another example, instructions as referred to herein may relate to encoded commands which are executable by a processing circuit having a command set which includes the encoded commands. Such an instruction may be encoded in the form of a machine language understood by the processing circuit. However, these are merely examples of an instruction, and the scope of the claimed subject matter is not limited in this respect.

Storage medium as referred to herein relates to media capable of maintaining expressions which are perceivable by one or more machines. For example, a storage medium may comprise one or more storage devices for storing machine-readable instructions and/or information. Such storage devices may comprise any one of several media types including, for example, magnetic, optical or semiconductor storage media. However, these are merely examples of a storage medium, and the scope of the claimed subject matter is not limited in this respect.

Logic as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA), for example. Also, logic may comprise machine-readable instructions stored in a storage medium in combination with processing circuitry to execute such machine-readable instructions. However, these are merely examples of structures which may provide logic, and the scope of the claimed subject matter is not limited in this respect.

An agent as referred to herein relates to a process that executes on a first device and is capable of communicating with a second device over a network. In one particular embodiment, for example, an agent process may collect information associated with the first device and enable transmission of the collected information to the second device. In another embodiment, an agent may receive control signals from the second device to enable remote control of at least one aspect of the first device. However, these are merely examples of how an agent may enable communication between devices, and the scope of the claimed subject matter is not limited in this respect. In another embodiment, an agent may execute on a processor under the control of machine-readable instructions stored on a storage medium. In another embodiment, an agent may be executed on different types of structure that provide logic. However, these are merely examples of an agent, and the scope of the claimed subject matter is not limited in this respect.

A Quality of Service (QoS) as referred to herein relates to a characteristic of a data transmission service to provide data to a recipient within time constraints. A quality of service may refer to a characteristic of a transmission control protocol/internet protocol (TCP/IP) type protocol, and/or a user datagram protocol/internet protocol (UDP/IP) type protocol. In one or more embodiments, a quality of service may refer to a threshold error transmission rate, for example where one or more data packets may not arrive, and/or where one or more data packets that do arrive may include one or more corrupted bits of information. In one or more embodiments, a quality of service may refer to where no errors and/or no error rate is acceptable, and/or to a threshold where the number of errors and/or the error rate may not exceed a predetermined value, and/or to a range within which a number of errors and/or an error rate may be acceptable, although the scope of claimed subject matter is not limited in this respect. In a particular embodiment, for example, a QoS may be associated with the transmission of a digital object from a source node to a destination node. Here, for example, a QoS may specify that all or a portion of the digital object arrive at the destination node within some time constraint. In another embodiment, a QoS may define, at least in part, an effective data rate at which a digital object is to be transmitted to the destination node. However, this is merely an example of how QoS may be applied in the transmission of a digital object, and the scope of the claimed subject matter is not limited in this respect.

Unless specifically stated otherwise, as apparent from the following discussion, it is appreciated that throughout this specification discussions utilizing terms such as processing, computing, calculating, selecting, forming, enabling, inhibiting, identifying, initiating, receiving, transmitting, determining and/or the like refer to the actions and/or processes that may be performed by a computing platform, such as a computer or a similar electronic computing device, that manipulates and/or transforms data represented as physical electronic and/or magnetic quantities and/or other physical quantities within the computing platform's processors, memories, registers, and/or other information storage, transmission, reception and/or display devices. Further, unless specifically stated otherwise, process described herein, with reference to flow diagrams or otherwise, may also be executed and/or controlled, in whole or in part, by such a computing platform.

Referring now to FIG. 1, a block diagram of a network in accordance with one or more embodiments will be discussed. A source node 110 may couple to an internet service provider (ISP) 112 that may provide source node 110 with access to network 100. In one embodiment, network 100 may include one or more nodes 114 on network 100 where a first node 114 may communicate with one or more other nodes 114 on network 100. In one embodiment, network 100 may comprise the Internet, although the scope of the claimed subject matter is not limited in this respect. Internet service provider 112 may provide source node 110 with access to network 100 via one or more data transmission access technologies, for example, public switched telephone network (PSTN), digital subscriber line (DSL), coaxial cable or wireless access, for example, using satellite and/or terrestrial links. However, these are merely examples of how a node such as source node 110 may obtain access to network 100, and the scope of the claimed subject matter is not limited in this respect. Network 100 may be capable of transmitting data packets among nodes 114 in a network topology according to an Internet Protocol (IP). However, this is merely an example of a communication protocol that may be used in the transmission of all or portions of a digital object from source node 110 to destination node 118, and the scope of the claimed subject matter is not limited in this respect. In the particular embodiment illustrated in FIG. 1, source node 110 and destination node 118 may access the data network 100 through the facilities of Internet service providers (ISPs) 112 and/or 116. For example, source node 110 and/or destination node 118 may comprise subscribers of corresponding ISPs that may enable access to network 100 for a subscription fee. However, ISPs 112 and/or 116 are merely examples of how source node 110 and/or destination node 118 may access network 100, and the scope of the claimed subject matter is not limited in this respect. It should be noted that there may be one or more source nodes 110 and one or more destination nodes 118 able to couple to network 100 via one or more of ISP 112 and/or one or more of ISP 116. Likewise, the number of nodes 114 in network 100 may be zero, and/or one or more, and nodes 114 may be capable of communicating with one or more other of nodes 114, although the scope of the claimed subject matter is not limited in this respect. Nodes 114 may be referred to in general as intermediaries referring to intermediate locations, devices, and/or paths between source node 110 and destination node 118, although the scope of the claimed subject matter is not limited in this respect. According to an embodiment, nodes 114 and/or ISP 112 and/or 116 may comprise one or more routers to forward data packets originating at source node 110 to destination node 118, although the scope of the claimed subject matter is not limited in this respect.

According to an embodiment, source node 110 and/or destination node 118, and/or optionally one or more of nodes 114, may comprise any one of several types of devices that are capable of transmitting and/or receiving digital objects. In one particular example, source node 110 and/or destination node 118 may include a communication port (not shown) adapted to transmit data to and/or receive data from one or more of ISP 112 and/or 116 through a data transmission medium using one or more of the herein mentioned access technologies. In addition to communication ports, source node 110 and/or destination node 118, and/or optionally one or more of nodes 114, may also comprise a computing platform employing a processor, one or more memory devices and appropriate input/output devices for communicating between processes executing on the processor and communication ports. Such processes executable on a computing platform may be controlled, at least in part, by machine-readable instructions stored in one or more memory devices of the computing platform. In one particular embodiment, a computing platform system at source node 110 may execute one or more processes to create and/or format a digital object for transmission on network 100. However, this is merely an example of how a source node 110 may create and/or format a digital object for transmission on network 100, and the scope of the claimed subject matter is not limited in this respect. In another particular embodiment, a computing platform at destination node 118 may execute one or more processes to utilize a digital object received via network 100 through a communication port. However, this is merely an example of how destination node 118 may process a digital object received from network 100, and the scope of the claimed subject matter is not limited in this respect.

According to an embodiment, equipment that is owned, leased, controlled and/or operated by owners and/or operators of nodes 114 may transmit digital objects between ISP 112 and ISP 116. Links coupling nodes 114 to ISP 112 and ISP 116 may comprise any one of several data transmission mediums such as, for example, cabling such as fiber optic, coaxial and/or unshielded twisted wire pair cabling, and/or wireless transmission media, for example, using terrestrial and/or satellite based links. However, these are merely examples of transmission media that may be utilized to transmit digital objects in network 100, and the scope of the claimed subject matter is not limited in this respect.

As illustrated in FIG. 1, ISP 112 may transmit a digital object to ISP 116 in any one of multiple paths comprising at least one or more corresponding nodes 114. According to a particular embodiment, ISP 112 may transmit a digital object to ISP 116 through any one of nodes 114 via any one or more of transmission links that may couple nodes 114. According to a particular embodiment, source node 110 and/or ISP 112 may select a particular one or more of nodes 114 to forward the digital object to ISP 116. However, this is merely an example of how a particular node 114 may be selected for forwarding a digital object from source node 110 to destination node 118, and the scope of the claimed subject matter is not limited in this respect.

According to an embodiment, although the scope of the claimed subject matter is not limited in this respect, nodes 114 may route digital objects between ISP 112 and ISP 116 in one or more data packets formatted according to a particular network protocol such as the Internet Protocol (IP). Such data packets may be forwarded on data links connecting nodes 114 and ISP 112 and ISP 116 according to any one of several data link layer protocols such as, for example, Ethernet, Asynchronous Transfer Mode (ATM), Frame Relay and/or Synchronous Optical NETwork/Sychronous Digital Hierarchy (SONET/SDH) data link protocols. In embodiments employing wireless communication links, data packets may be forwarded on such wireless communication links according to any one of several wireless data link protocols such as, for example, IEEE Standards 802.11, 802.16 and/or the like, and/or wireless data link protocol including, for example, but not limited to, Code Division Multiple access (CDMA), Single Carrier Radio Transmission Technology (1×RTT), Enhanced Data for Global Evolution (EDGE), Evolution Data Only (EV-DO), Fast Low-latency Access with Seamless Handoff Orthogonal Frequency Division Multiplexing (Flash-OFDM), General Packet Radio Service (GPRS), Global System for Mobile Communications (GSM), and/or Universal Mobile Telecommunications System (UMTS), and/or the like. However, these are merely examples of data link protocols that may be used to transmit and/or receive data packets in network 100, and the scope of the claimed subject matter is not limited in this respect.

Figure 2:
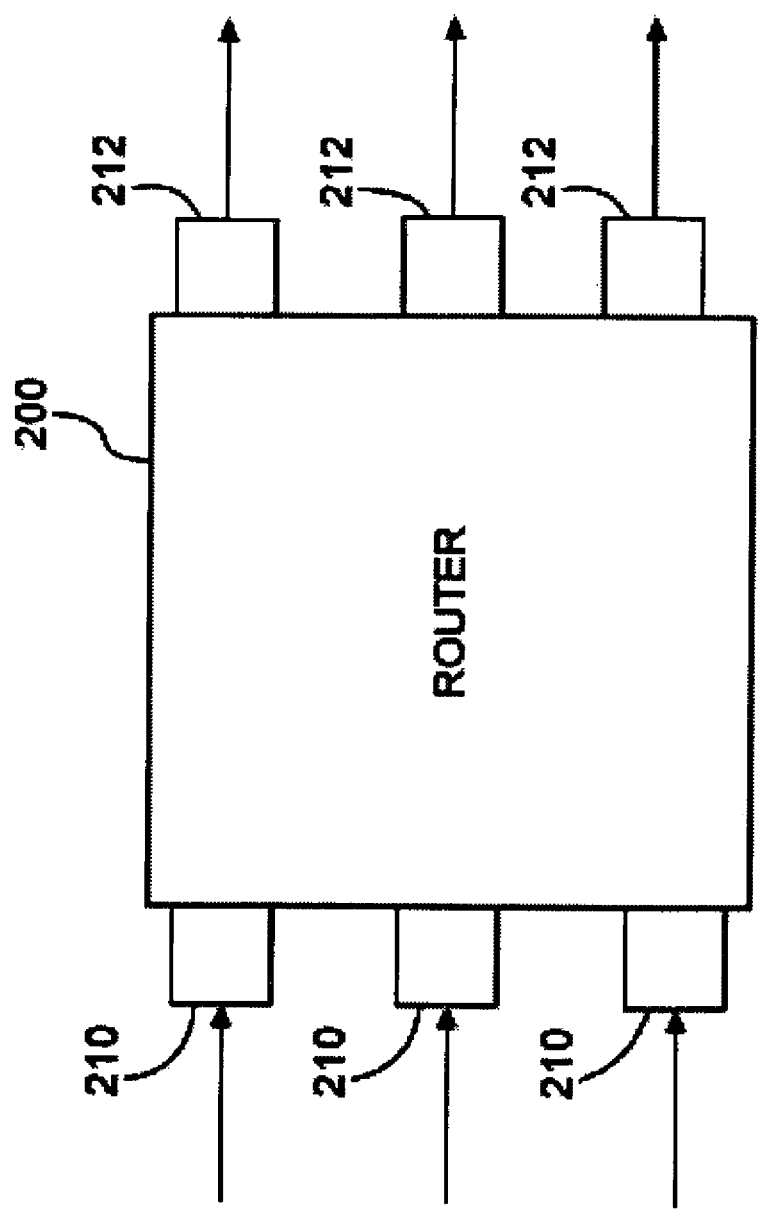
FIG. 2 is a block diagram of an example embodiment of a router that may be owned, leased, controlled and/or operated by an intermediary for transmitting at least a portion of a digital object to a destination node.

Referring now to FIG. 2, a block diagram of a router in accordance with one or more embodiments will be discussed. The router 200 shown in FIG. 2 may be owned, leased and/or operated at a node 114 and/or ISP 112 and/or ISP 116 to transmit at least a portion of a digital object to destination node 118 according to an embodiment. Router 200 may include one or more input ports 210 to receive data packet communications according to one or more protocols mentioned herein. One or more of input ports 210 may be capable of receiving all or at least a portion of a digital object from ISP 112 originating from source node 110. Router 200 may also include one or more output ports 212 to transmit data packet communications according to one or more of the protocols mentioned herein. One or more of output ports 212 may be capable of transmitting all or a portion of a digital object to ISP 116, and the packet may then be forwarded to one or more destination nodes 118.

According to an embodiment, router 200 may comprise logic to determine how to forward packets received on input ports 210 to output ports 212. For example, router 200 may determine an output port 212 for forwarding a received data packet based, at least in part, on information associated with the received data packet such as, for example, a destination address. According to a particular embodiment, router 200 may determine an output port 212 for forwarding the received data packet according to one or more look up tables associating destination Internet Protocol (IP) address with output ports 212. However, this is merely an example of how a router may determine an output port for forwarding a data packet, and the scope of the claimed subject matter is not limited in this respect. Notwithstanding the existence of a valid destination address associated with a received data packet, according to an embodiment, router 200 may also select whether or not to forward a received data packet based, at least in part, on information such as the destination and/or source associated with the data packet, or other information associated with the data packet.

According to an embodiment, the aforementioned logic of router 200 to control routing data packets from an input port 210 to an output port 212 may comprise one or more computer systems comprising one or more processors and memory devices. The memory devices may comprise machine-readable instructions to execute on the one or more processors for controlling the routing of data packets. Alternatively, router 200 may comprise one or more Application Specific Integrated Circuit (ASIC) devices to control routing, and/or combinations of one or more ASIC devices and one or more computer systems to control routing. However, these are merely examples of logic that may be employed in a router for controlling the forwarding of data packets and claimed subject matter is not limited in these respects. In one or more embodiments, router 200 may comprise and/or be implemented by one or more computing platforms as described herein, for example as a network interface card and/or a server adapted to operate at least in part as a router and/or to provide one or more routing functions, although the scope of the claimed subject matter is not limited in this respect.

According to an embodiment, one or more of nodes 114 and one or more of ISP 112 and/or ISP 116, for example as shown in FIG. 1, may employ more than one router 200 to forward a digital object to a destination node 118. A digital object received from source node 110 at a first router may be forwarded to a second router where both first and second routers are owned, leased, controlled and/or operated by nodes 114 and/or ISP 112 and/or ISP 116. In such an embodiment, the first router may receive the digital object from ISP 112 and forward the received digital object to the second router either directly to the second router or via one or more other routing devices. The second router may then forward to ISP 116 the digital object received from the first router. However, this is merely an example of how a node as an intermediary may employ multiple routers for forwarding a digital object from a source node to a destination node, and claimed subject matter is not limited in this respect.

According to an embodiment, one or more of nodes 114 and/or ISP 112 and/or ISP 116 may employ Multiprotocol Label Switching (MPLS) according to the MPLS Architecture set forth, for example, in Internet Engineering Task Force (IETF), Network Working Group, RFC 3031, 2001. In such an embodiment, ISP 112 may comprise a label edge router (LER) that is capable of assigning label values to packets received from source node 110 for transmission to destination node 118. One or more routers 200 of nodes 114 may comprise a Label Switch Router (LSR) to make forwarding decisions for received data packets based, at least in part, upon label values assigned to the received data packets. At a network hop between ISP 112 and ISP 116, an LSR associated with one or more of nodes 114 may remove an existing label of a received data packet and apply a new label indicating how the next, downstream LSR is to forward the data packet to a destination. Label switch routers coupled to forward a digital object from ISP 112 to ISP 116 may then form a Label Switch Path (LSP) determined, at least in part, according to labels, selected from a hierarchy of labels known as a label stack, assigned to data packets transporting the digital object at network hops between ISP 112 and ISP 116. However, this is merely an example of how a digital object may be transmitted between nodes on a data transmission network using MPLS, and the scope of the claimed subject matter is not limited in this respect.

In one or more embodiments, router 200 may implement routing of packets and/or data using existing processes, routing tables, and/or MPLS to shape the flow of traffic, optionally without consideration for the object-based QoS requirements and/or other criteria as it pertains to the transmission of a particular digital object and/or a series of objects. In one or more embodiments, router 200 may implement routing of packets and/or data using existing processes, routing tables, and/or MPLS to shape the flow of traffic, optionally including consideration for the object-based QoS requirements and/or other criteria as it pertains to the transmission of a particular digital object and/or a series of objects. In one or more embodiments, router 200 may be programmed with software and/or firmware to implement routing of packets and/or data, and in one or more alternative embodiments, router 200 may be wired and/or utilize switches to implement routing of packets and/or data at a predetermined QoS based at least in part on packet traffic, although the scope of claimed subject matter is not limited in this respect. In one or more embodiments, instructions by which router 200 may be arranged to route and/or forward packets may be received from a source external to router 200, and in one or more embodiments, router 200 may be arranged to forward predetermined packets and/or digital object in a predetermined setting, for example where one of input ports 210 may be coupled to one or more output ports 212, which may be arranged, for example, to last for a predetermined period of time, although the scope of claimed subject matter is not limited in this respect.

Figure 3:
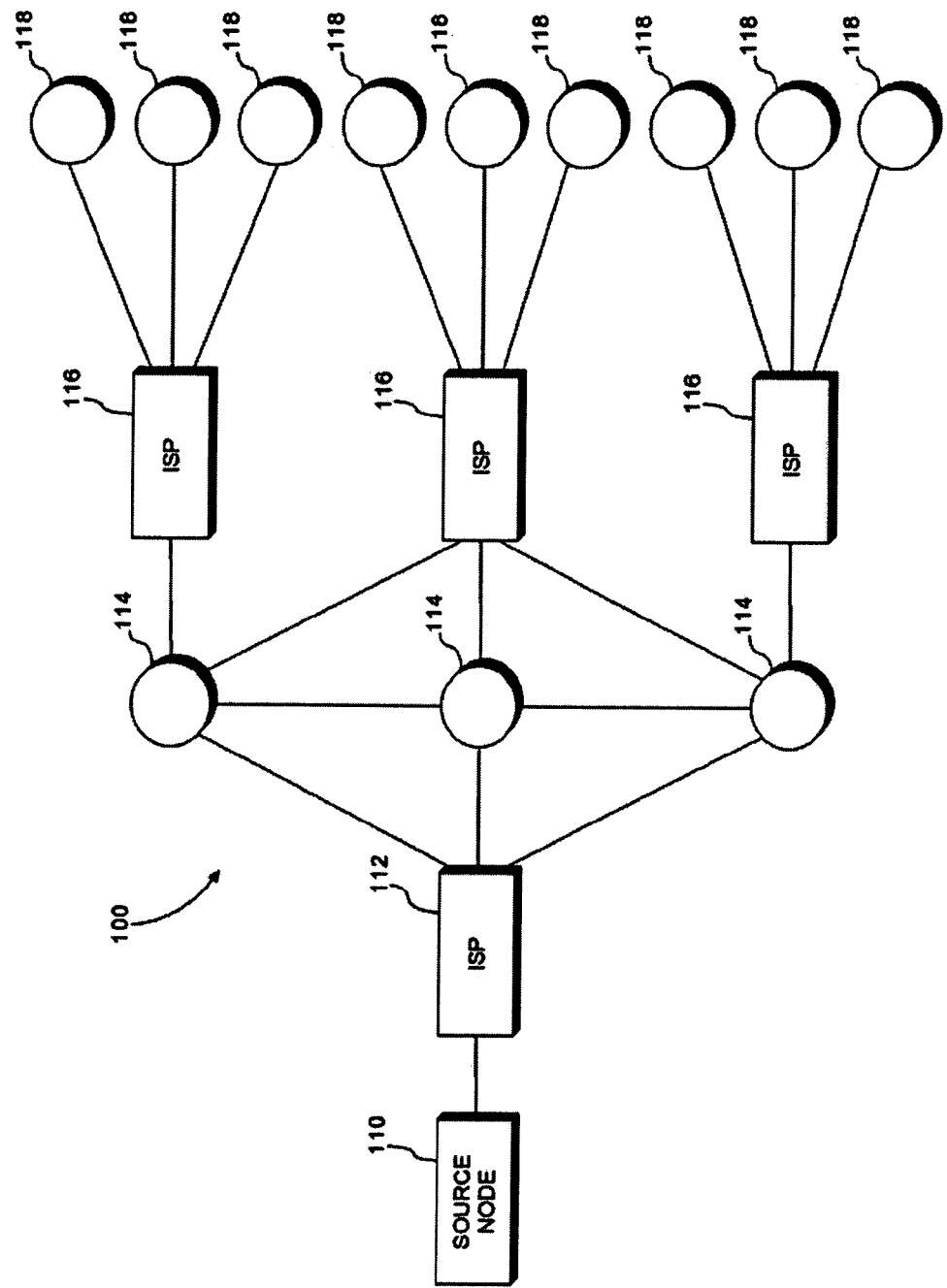
FIG. 3 is a block diagram of an example embodiment of a data transmission network.

Referring now to FIG. 3, a block diagram of a network that may be utilized to transmit a digital object to two or more nodes in accordance with one or more embodiments will be discussed. As shown in FIG. 3, source node 110 may transmit a digital object to more than one destination node 118 coupled to one or more ISPs 116. Likewise, although not shown, destination node and/or nodes 118 may receive a digital object from more than one source node and/or nodes 110. One or more intermediary nodes 114 may be employed to forward the digital object to two or more destination nodes 118. In one or more alternative embodiments, source node 110 may transmit a digital object in two or more sets of data packets using multiple intermediaries, for example where there may be more than one destination node and/or where a single larger sized object may be split into multiple sub-objects to be transmitted on a separate path and/or paths using a separate criterion and/or criteria, for example QoS, costs, and so on, although the scope of claimed subject matter is not limited in this respect. According to an embodiment, a digital object formatted for transmission to one or more of destination nodes 118 may be copied at either ISP 112 or one or more of nodes 114 or one or more of ISP 116 for transmission to multiple destination nodes 118. An intermediary one or more of nodes 114 may comprise one or more routers, such as router 200, for example, to forward data packets to one or more of destination nodes 118. Furthermore, network 100 may employ MPLS and select particular one or more intermediary nodes 114 for forwarding the digital object to one or more destination nodes 118.

In the embodiment shown in FIG. 3, a single intermediary node 114 may be capable of forwarding a digital object from ISP 112 to one or more destination nodes 114 coupled to any of ISPs 116. Likewise, an intermediary node 114 may forward the digital object to multiple destination nodes 118 coupled to all of ISPs 116 by selecting another intermediary node 114 through which the digital object may be routed to selected ISPs 116 and then on to selected destination nodes 118, although the scope of the claimed subject matter is not limited in this respect.

In one or more embodiments, network 100 as shown in FIG. 1 and/or FIG. 3 may determine a route for transmitting a digital object between a router 200 at ISP 112 and a router at ISP 116, a route for transmitting a digital object between a router 200 at one intermediary node 114 and a router 200 at another intermediary node 114, and/or a route for transmitting a digital object between a router at an intermediary node 114 and ISP 112 and/or ISP 116. When source node 110 is prepared to send a digital object to destination node 118, source node 110 may transmit information relating to the digital object to be sent to ISP 112. Such information relating to the digital object to be sent may be referred to as digital object information. Such digital object information may include, for example, the size of the digital object, for example in megabytes, the priority of the digital object with respect to a priority of one or more other digital objects, the time frame in which it may be desired to transmit the digital object, the link quality that may be desired between source node 110 and destination node 118, a quality of service (QoS) that may be desired between source node 110 and destination node 118, a latency parameter that may be desired between source node 110 and destination node 118, the type of information that the digital object comprises, for example text data, e-mail data, HTML data, media data, the format of the data file, and so on. In one or more embodiments, digital object information may comprise a digital title and transmission form (DTTF). A DTTF, for example, may comprise predefined fields that specify terms of a service request for the service of transmitting a digital object to a destination node. Such predefined fields may be used for providing information to a requesting party such as, for example, size of the digital object to be transmitted, for example in bits, bytes, cells, packets, and/or the like, destination address and/or addresses, QoS, compression format, security/encryption, billing account number, title and/or rights information, and so on. However, these are merely examples of predefined fields that may be used in a DTTF for providing a service request, and the scope of claimed subject matter is not limited in these respects. In one or more embodiments, digital object information, for example a DTTF, may be an object that is separate, wholly or at least in part, from the digital object itself. For example, digital object information may be a separate routing bill and/or stub that contains destination information pertaining to the digital object, sender information, receiving information, quality of service information, routing path information, and so on. In such embodiments, the digital object information may be routed along with the digital object, or alternatively may be routed independently from the digital object, at least in part, and/or may follow a different transmission path along network 100. In one or more embodiments, digital object information may indicate to one or more downstream nodes, such as nodes 114, what is coming and/or contained in the digital object, and/or the requested quality of service, and/or a request for information from the downstream nodes whether the downstream nodes can handle the digital object, store the digital object, forward the digital object, and so on. In one or more embodiments, the digital object information may reach the same destination as the digital object, and in one or more alternative embodiments the digital object information may not actually reach and/or may not be required to reach the same destination as the digital object. However, these are merely examples of how digital object information may be embodied, and the scope of the claimed subject matter is not limited in these respects.

In one or more embodiments, a digital object (DO) may refer to the payload to be transmitted on network 100, for example a movie file, and a digital title and transmission form (DTTF) may refer to information regarding the digital object, which may be referred to as digital object information. For example, a digital title and transmission form may be another object, typically smaller, but not necessarily smaller, than the digital object, and may be an object independent from the digital object itself, that represents the digital object and/or information regarding the digital object. In one embodiment, the digital title and transmission form may comprise metadata about the digital object, for example size, bid, charges, QoS, routing information, ownership and/or licensing rights, encryption, and/or the like. The digital title and transmission form may traverse the same path in network 100 as the digital object, and/or the digital transmission form may traverse a path that is different at least in part from the digital object. In one or more embodiments, a digital title and transmission form may not be required and/or utilized, for example where preexisting agreements and/or prearranged routs may exist to handle the forwarding of the digital object. In other embodiments, a digital title and transmission form may be utilized as an instrument in which bids and/or costs for forwarding the digital object on network 100 may be utilized and/or negotiated prior to the transmission of the digital object on network 100. In any given network in certain embodiments, a digital object may include a corresponding digital title and transmission form, and in other embodiments, a digital object may not have a corresponding digital title and transmission form. However, these are merely examples of how a digital title and transmission form may be utilized to transmit a digital object via network 100, and the scope of claimed subject matter is not limited in these respects.

In one or more embodiments, router 200 at ISP 112 may, for example, examine the traffic loads between ISP 112 and one or more intermediary nodes 114, which may include, for example, intermediary nodes 114 that are coupled to or proximately coupled to one or more output ports 212 of router 200. In one embodiment, for example, when a router 200 at ISP 112 transmits data packets to routers 200 at nodes 114, routers 200 may transmit information regarding the link between ISP 112 and node 114, for example the transmission time, latency time, channel information, link quality, error rate, retransmission rate, and/or the load on router 200 nodes 114. In general, such information may be referred to as link information. When router 200 of ISP 112 receives such link information from routers 200 downstream nodes 114, router 200 of ISP 112 may determine which of nodes 114 are suitable for transmission of the digital object based from ISP 112 to nodes 114 on at least in part on the link information and the digital object information. For example, if the digital objection information specifies a particular security protocol, ISP 112 may determine which links between ISP 112 and nodes 114 are capable of providing the requested security based on the link information received from nodes 114, and will transmit the digital object to intermediary nodes 114 where the links between ISP 112 and intermediary nodes 114 satisfy the security requirements. Likewise, such a process may be implemented by routers 200 in each subsequent intermediary node 114 that receives the digital object for retransmission to another intermediary as the digital object travels via network 100 until the digital object reaches its selected destination node, although the scope of the claimed subject matter is not limited in this respect.

In one embodiment, routers 200 of ISP 112, and/or ISP 116, and/or nodes 116 may include a routing table that specifies where digital objects may be routed based on the link information between nodes 114, ISP 112, and/or ISP 116. Such routing tables may be periodically updated as packet loads and related link information between two routers 200 change over time, based at least in part on changing link information that routers 200 receive from other downstream routers 200. Furthermore, the routing tables may be updated based at least in part on the number of digital objects received over a given unit of time, and/or based at least in part on the digital object information specified in the digital information objects. As the routing tables are updated, digital information objects received by routers 200 may be routed to updated downstream nodes 114 according to the updated routing tables, although the scope of the claimed subject matter is not limited in this respect.

In one or more embodiments, a digital object may be sufficiently large such that it may be desirable to split the digital object into one or more sub-objects, for example at source node 110, and/or ISP 112, and/or at one or more of intermediary nodes 114, where one or more of the sub-objects may be provided with its own individual routing requirements, quality of service, routing paths, and so on, and where the sub-objects may be reassembled at one or more of intermediary nodes 114, and/or ISP 116, and/or one or more of destination nodes 118. Such a sub-object concept in one or more embodiments may be analogous to data transfer utilizing packets, where the sub-objects may be at a higher level of organization than a packet, but may be at a lower level of organization that the digital object itself. For example, a multimedia object may be split into a video sub-object and an audio sub-object, and/or a multimedia object may be split into a sub-objects corresponding to the scenes contained in the multimedia object, although the scope of claimed subject matter is not limited in this respect. An example of such a digital object that may be suitable for being split up into one or more smaller objects may be where the digital object is a movie. In one or more embodiments, a transmission of such an object may include a multiple input, multiple output (MIMO) transmission system and/or a spatial division, multiple access system, for example where two or more sub-objects may be transmitted in parallel in two or more links. In one particular embodiment, a network that may be suitable for splitting a digital object into one or more sub-objects may comprise at least a portion of the network operating in compliance with an Institute of Electrical and Electronics Engineers (IEEE) 802.16 type standard such as a WiMax type standard, although the scope of claimed subject matter is not limited in this respect. For one or more embodiments, each sub-object of a digital object may be associated at least in part with the same digital title and transmission form.

As previously mentioned, digital object information may be transmitted over a network separately from the digital object associated with the digital object information. For example, a DTTF may be transmitted in advance of an associated digital object, where the DTTF may be used by one or more intermediaries and/or proxies and/or service providers to determine whether the respective intermediaries, proxies, and/or services providers have the capacity and/or rights to store and/or transmit the digital object. For one or more embodiments, the digital object may not be transmitted from a source to a destination until after the various capabilities and/or rights of the providers, proxies, and/or intermediaries have been established. Because a DTTF may be much smaller in size that an associated digital object, using the DTTF to establish capacity and/or rights may result in a reduction in the use of network resources.

Figure 4:
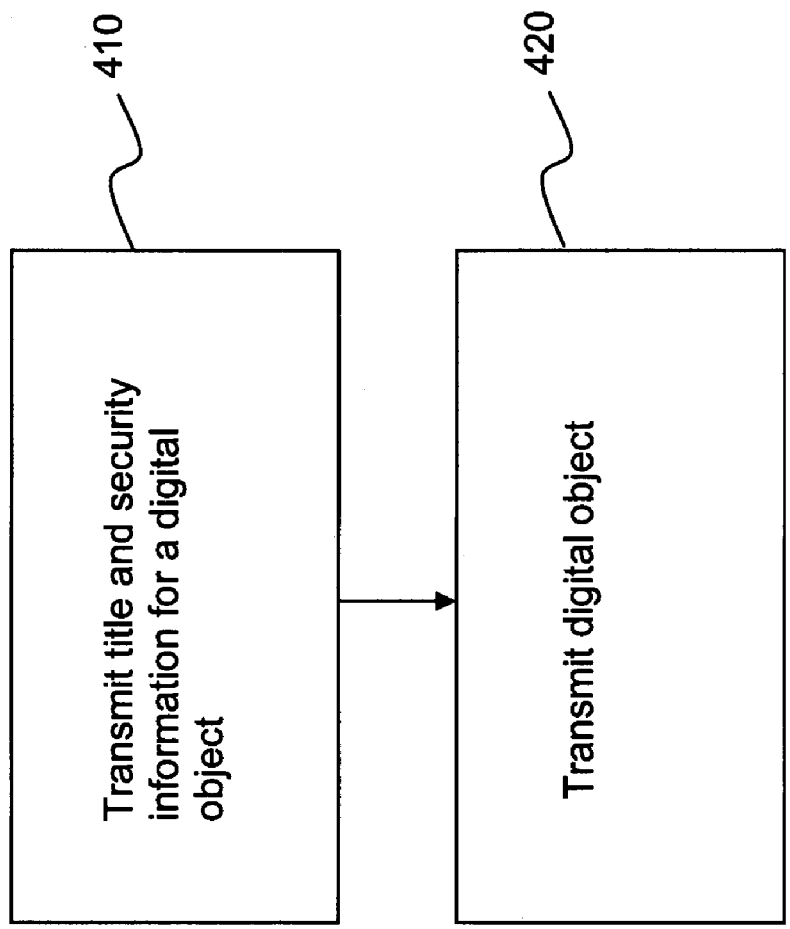
FIG. 4 is a flow diagram of an example embodiment of a method for transmitting title and/or security information for a digital object separately from the digital object.

FIG. 4 is a flow chart of an example embodiment of a method for transmitting digital object information separately from a digital object associated with the digital object information. The example embodiment of FIG. 4 may include all, more than all, and/or less than all of blocks 410-420, and furthermore the order of blocks 410-420 is merely an example order, and the scope of the claimed subject matter is not limited in this respect. At block 410, title and security information for a digital object is transmitted. For this example, the title and security information may comprise a digital title and transmission form, although the claimed subject matter is not limited in this respect. The digital title and transmission form may comprise information related to a digital object, including information regarding usage rights/licensing, encryption, file size, file type, etc., although again the claimed subject matter is not limited in these respects. At block 420, the digital object may be transmitted. For this example embodiment, the DTTF and the digital object may be transmitted from a source device to a destination device over a network, such as network 100 discussed above.

FIG. 5 is a diagram of an example digital title and transmission form 500. The example embodiment of FIG. 5 may include all, more than all, or less than all of fields 510-580, and furthermore the configuration of the various fields depicted in FIG. 5 is merely an example configuration, and the scope of the claimed subject matter is not limited in this respect. DTTF 500 may comprise a payload identification (payload ID) field 510. The payload ID 510 for this example embodiment may comprise a unique calculated value created by using a hashing function against a digital object to be associated with DTTF 500. Of course, this is merely an example for creating a payload ID, and the scope of the claimed subject matter is not limited in this respect. The payload ID value may be used, at least in part, to identify a digital object payload associated with the DTTF.

DTTF 500 may also comprise an assignee ID field 520. The assignee ID value for this example embodiment may comprise a unique value that identifies an entity to which various rights/licenses associated with the digital object identified in the payload ID field may be assigned. Additionally, a proxy ID field 530 may comprise a unique value that identifies a proxy/intermediary that may be authorized to store and/or transmit the digital object identified by the payload ID.

DTTF 500 may also comprise a file size field 540 and a file type field 550. The file size of the digital object identified by the payload ID may be expressed in a variety of ways, for example in bits, bytes, cells, packets, and/or the like. The types of files that may be indicated by the file type field may comprise any of a wide range of file types, including, but not limited to, movie files, music files, photographs or other digital imagery, presentations, database files, software programs, etc.

Also for this example embodiment, DTTF 500 may comprise one or more handling requirements field 560. The handling requirements specified in field 560 may include security, perhaps including encryption information. For one embodiment, an encryption key may be included in the handling requirements field 560. The encryption key may allow an entity (for example, an entity identified in the assignee ID field) that is authorized to receive the digital object associated with DTTF 500 to decrypt the digital object. The digital object associated with the DTTF may be encrypted with the encryption key. For one embodiment, the encryption key may comprise a symmetrical encryption key, although the scope of the claimed subject matter is not limited in this respect.

One or more description fields 570 may also be comprised by the example DTTF 500. The description information may include any of a wide range of information associated with the digital object identified in the payload ID field 510. For one example embodiment, although the claimed subject matter is not limited in these respects, if the digital object is a movie file, the description field may comprise information identifying the screenwriter, director, actors, movie title, movie rating, etc.

DTTF 500 may also, for an embodiment, comprise a provenance field 580. Provenance field 580 may include a listing of previous rights holders for the digital object identified in payload ID field 510. Provenance field 580 may be updated whenever a transfer of rights and/or title occurs with regard to the digital object. In this manner, DTTF 500 may include a history of previous owners and/or license holders for the digital object identified in the payload ID field.

Figure 6:
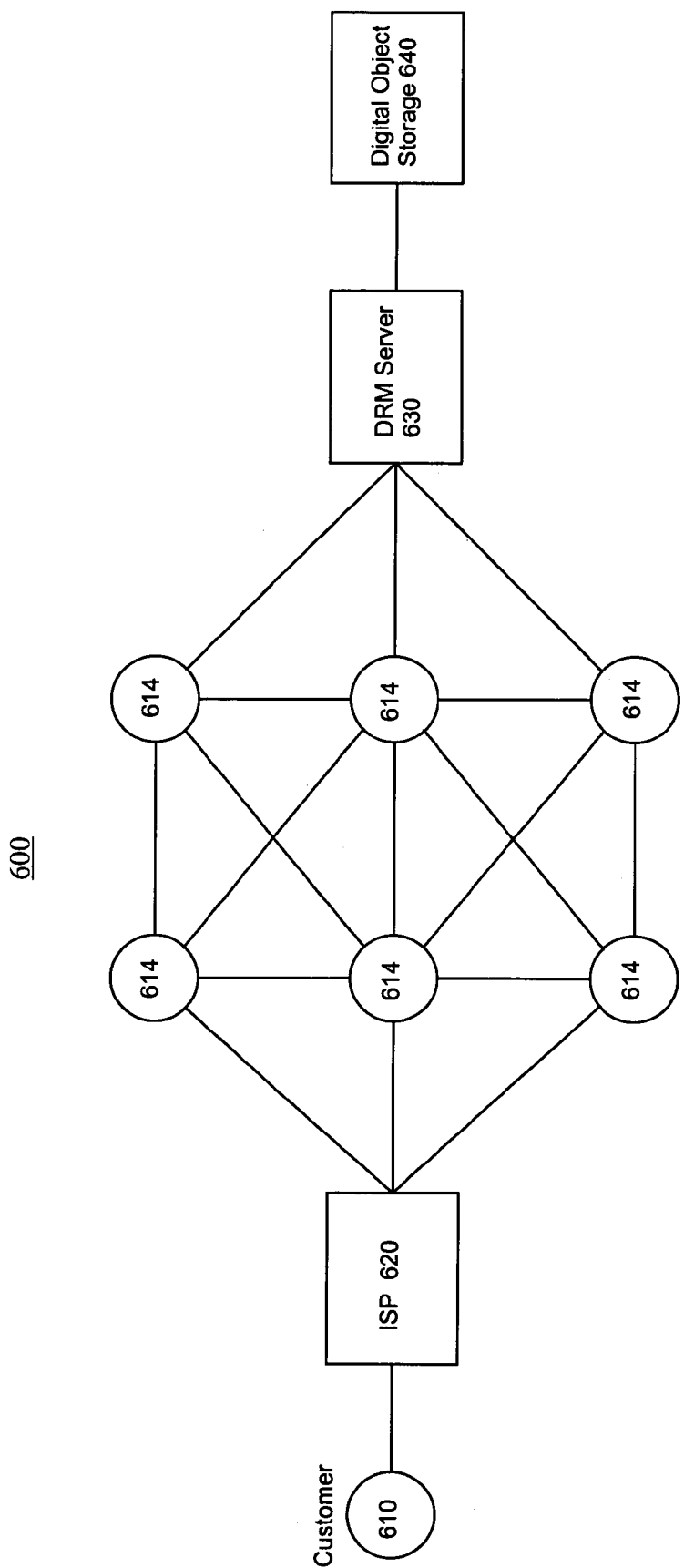
FIG. 6 is a block diagram of an example embodiment of a data transmission network.

Referring now to FIG. 6, a block diagram of a network in accordance with one or more embodiments will be discussed. A source node 610 may couple to an internet service provider (ISP) 620 that may provide source node 610 with access to network 600. In one embodiment, network 600 may include one or more nodes 614 on network 600 where a first node 614 may communicate with one or more other nodes 614 on network 600. In one embodiment, network 600 may comprise the Internet, although the scope of the claimed subject matter is not limited in this respect. Internet service provider 620 may couple a customer node 610 and/or a digital rights management (DRM) server 630 with access to network 600 via one or more data transmission access technologies, for example, public switched telephone network (PSTN), digital subscriber line (DSL), coaxial cable or wireless access, for example, using satellite and/or terrestrial links. However, these are merely examples of how nodes such as customer node 610 and DRM server 630 may obtain access to network 600, and the scope of the claimed subject matter is not limited in this respect. Network 600 may be capable of transmitting data packets among nodes 614 in a network topology according to an Internet Protocol (IP). However, this is merely an example of a communication protocol that may be used in the transmission of all or portions of a digital object from DRM server 630 to customer node 610, and the scope of the claimed subject matter is not limited in this respect. In the particular embodiment illustrated in FIG. 6, customer node 610 may access the data network 600 through the facilities of Internet service provider 620. For example, customer node 610 may comprise a subscriber of ISP 620 that may enable access to network 600 for a subscription fee. However, ISP 620 is merely an example of how customer node 610 may access network 600, and the scope of the claimed subject matter is not limited in this respect. It should be noted that there may be one or more customer nodes 610 and one or more destination nodes able to couple to network 600 via one or more of ISPs. Likewise, the number of nodes 614 in network 600 may be zero, and/or one or more, and nodes 614 may be capable of communicating with one or more other of nodes 614, although the scope of the claimed subject matter is not limited in this respect. Nodes 614 may be referred to in general as intermediaries referring to intermediate locations, devices, and/or paths between customer node 610 and DRM server 630, although the scope of the claimed subject matter is not limited in this respect. According to an embodiment, nodes 614 and/or ISP 620 may comprise one or more routers to forward data packets originating at customer node 610 and/or DRM server 630, although the scope of the claimed subject matter is not limited in this respect.

According to an embodiment, equipment that is owned, leased, controlled and/or operated by owners and/or operators of nodes 614 may transmit digital objects and/or digital object information between DRM Server 630 and ISP 620. Links coupling nodes 614 to ISP 620 and DRM Server 630 may comprise any one of several data transmission mediums such as, for example, cabling such as fiber optic, coaxial and/or unshielded twisted wire pair cabling, and/or wireless transmission media, for example, using terrestrial and/or satellite based links. However, these are merely examples of transmission media that may be utilized to transmit digital objects in network 600, and the scope of the claimed subject matter is not limited in this respect.

For an embodiment, customer node 610 may comprise a computing platform operated by a user. The user may initiate a transaction, for example a transaction involving the purchase and download of a digital object stored at a digital object storage device 640. For one or more embodiments, the digital object may comprise a movie file, although the claimed subject matter is not limited in this respect. For an embodiment, the user may place an order on a secure website hosted on DRM server 630 or on a separate e-commence server working in conjunction with DRM server 630. In response to the placement of the order, DRM server 630 may create a DTTF. The DTTF for this example may include a payload ID that uniquely identifies the order movie file. The DTTF may also include an assignee ID value uniquely identifying the user as the assignee, indicating that the user has the right to download, decrypt, and play the movie file. The DTTF may also include information regarding the size of the movie file and the file type. The DTTF may also include other metadata associated with the movie file, such as data regarding the movie title, the director, actors, etc. The DTTF may also include information regarding the secure transmission and storage of the movie file. For example, the DTTF for this example may include an encryption key that may be used by a software agent executed at customer node 610 to decrypt the movie in preparation for playback. For some embodiments, the user may be required to establish his or her identity in order to obtain the key to be used to obtain and/or decrypt a digital object, in this example the movie file.

The DTTF for this example may be transmitted by DRM server 630 to customer node 610 via one or more intermediaries 614. In one or more embodiments, the DTTF may be used by one or more intermediaries and/or proxies and/or service providers to determine whether the respective intermediaries, proxies, and/or services providers have the capacity and/or rights to store and/or transmit the digital object, in this example the ordered movie file. For one or more embodiments, the movie may not be transmitted from digital object storage 640 to customer node 610 until after the various capabilities and/or rights of the providers, proxies, and/or intermediaries have been established. For this example embodiment, once the capabilities and/or rights of the various providers, proxies, and/or intermediaries have been established, the movie file may be transmitted from digital object storage 640 to customer node 610.

Figure 7:
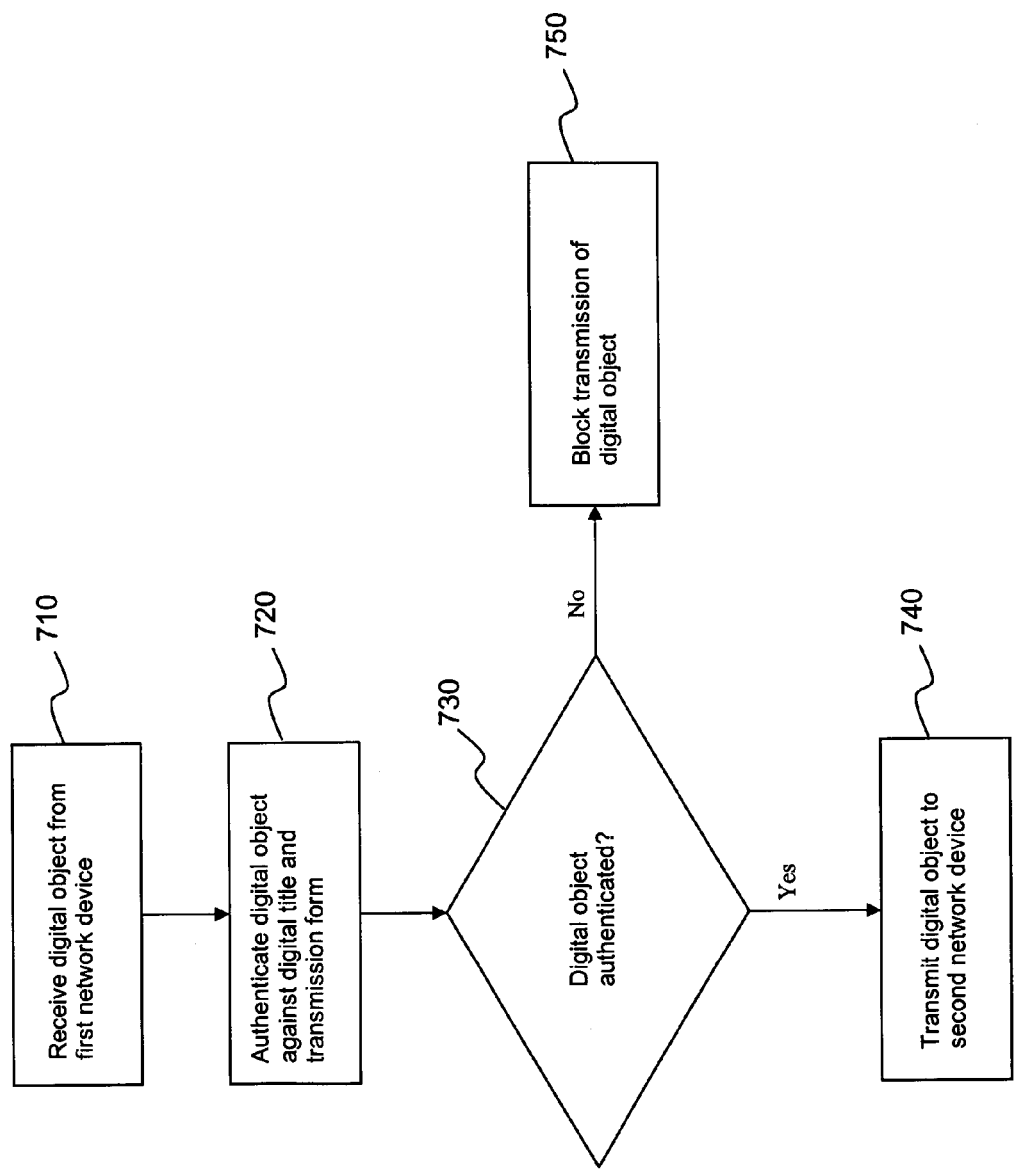
FIG. 7 is a flow diagram of an example embodiment of a method for authenticating a digital object against a digital title and transmission form.

FIG. 7 is a flow chart of an example embodiment of a method for authenticating a digital object against a digital title and transmission form. The example embodiment of FIG. 7 may include all, more than all, and/or less than all of blocks 710-750, and furthermore the order of blocks 710-750 is merely an example order, and the scope of the claimed subject matter is not limited in this respect. At block 710, a digital object is received from a first network device. For one example embodiment, the first network device may comprise a digital object storage device, although the claimed subject matter is not limited in this respect. At block 720, an attempt is made to authenticate the received digital object against a digital title and transmission form. For an embodiment, the DTTF may be implemented in accordance with one or more of the example embodiments described above. Block 730 indicates that if the digital object is authenticated, the digital object is transmitted to a second network device at block 740. If the digital object is not authenticated, the transmission of the digital object is blocked at block 750. For an embodiment, authentication of the digital object may include determining whether a DTTF associated with the digital object includes information that permits an intermediary performing the authentication to transmit the digital object.

For one or more embodiments, multiple DTTFs associated with one or more digital objects may be stored at a central location, for example at a DRM server. In other embodiments, the DTTFs may be stored in a distributed database that may be analogous to DNS distributed databases. For an embodiment, transmission of a digital object may be blocked if the digital object does not match up with a payload ID in a distributed and/or central database of DTTFs. Also, for an embodiment, the transmission of the digital object may be blocked where a payload ID is found, but where transmission is restricted according to other information contained in the DTTF.

What is claimed is:

1. A method, comprising:
a source computing device generating a digital title and transmission form for a particular digital object to be routed to a destination computing device via a network, wherein the digital title and transmission form is wholly separate from any portion of the particular digital object, includes information identifying the particular digital object, and includes an assignee identification value that identifies an entity having one or more rights associated with the particular digital object, wherein the source computing device comprises a processor and a memory; and the source computing device transmitting the digital title and transmission form to a first device in the network, wherein the digital title and transmission form is transmitted separately from any portion of the particular digital object;

wherein the digital title and transmission form includes a request for information regarding the capability of the first device to route at least a portion of the particular digital object within the network, and wherein a transmission of the at least a portion of the particular digital object comprises two or more data packets; and wherein the digital title and transmission form is forwardable, separate from any portion of the particular digital object, by the first device to a second device in the network to request information regarding the capability of the second device to route the at least a portion of the particular digital object within the network.

2. The method of claim 1, further comprising the source computing device transmitting the at least a portion of the particular digital object, wherein the transmission of the at least a portion of the particular digital object comprises two or more Internet Protocol data packets.

3. The method of claim 1, wherein said generating the digital title and transmission form further comprises generating the assignee identification value.

4. The method of claim 1, wherein said generating the digital title and transmission form further comprises storing an encryption key associated with the particular digital object in the digital title and transmission form.

5. The method of claim 1, wherein said generating the digital title and transmission form further comprises storing metadata associated with the particular digital object in the digital title and transmission form.

6. The method of claim 1, wherein the particular digital object includes a media file, and wherein the one or more rights associated with the particular digital object include a right to play the media file.

7. The method of claim 1, wherein said generating the digital title and transmission form further comprises storing a value representing a file type associated with the particular digital object in the digital title and transmission form.

8. The method of claim 1, wherein said generating the digital title and transmission form further comprises storing provenance data in the digital title and transmission form.

9. The method of claim 1, wherein said generating the digital title and transmission form further comprises storing a proxy identification value in the digital title and transmission form.

10. A non-transitory computer-readable medium having stored thereon instructions that are executable by a source computing device having a memory and a processor to cause the source computing device to perform operations comprising:

generating a digital title and transmission form for a first digital object to be transmitted to a destination computing device via a network, wherein the digital title and transmission form is wholly separate from any portion of the first digital object and includes information identifying the first digital object, and wherein the digital title and transmission form includes an assignee identification value that identifies an entity having one or more rights associated with the first digital object; and transmitting the digital title and transmission form to a first device in the network, wherein the digital title and transmission form is transmitted separately from any portion of the first digital object;

wherein the digital title and transmission form includes a request for information regarding the capability of the first device to route at least a portion of the first digital object within the network according to one or more routing requirements specified in the digital title and transmission form, wherein a transmission of the at least a portion of the first digital object comprises two or more data packets; and wherein the digital title and transmission form is forwardable, separate from any portion of the first digital object, by the first device to a second device in the network to request information regarding the capability of the second device to route the at least a portion of the first digital object within the network in a manner fulfilling at least one of the one or more routing requirements specified in the digital title and transmission form.

11. The computer-readable medium of claim 10, wherein said generating the digital title and transmission form further comprises creating a payload identification value by performing a hashing function on the first digital object, wherein the digital title and transmission form comprises the payload identification value.

12. The computer-readable medium of claim 10, wherein said generating the digital title and transmission form further comprises generating the assignee identification value.

13. The computer-readable medium of claim 10, wherein said generating the digital title and transmission form further comprises storing an encryption key associated with the first digital object in the digital title and transmission form.

14. The computer-readable medium of claim 10, wherein said generating the digital title and transmission form further comprises storing metadata associated with the first digital object in the digital title and transmission form.

15. The computer-readable medium of claim 10, wherein said generating the digital title and transmission form further comprises storing a value representing a file size associated with the first digital object in the digital title and transmission form.

16. The computer-readable medium of claim 10, wherein said generating the digital title and transmission form further comprises storing a value representing a file type associated with the first digital object in the digital title and transmission form.

17. The computer-readable medium of claim 10, wherein said generating the digital title and transmission form further comprises storing provenance data in the digital title and transmission form.

18. The computer-readable medium of claim 10, wherein the operations further include transmitting the at least a portion of the first digital object, wherein the one or more rights associated with the first digital object include a right of the entity to receive the first digital object.

19. An apparatus, comprising:
a processor; and
a memory coupled to the processor, wherein the memory has program instructions stored thereon that are executable by the processor to cause the apparatus to:
generate a digital title and transmission form for a digital object to be routed to a destination computing device via a network, wherein the digital title and transmission form is wholly separate from any portion of the digital object and includes information identifying the digital object, and wherein the digital title and transmission form includes an assignee identification value that identifies an entity having one or more rights associated with the digital object; and transmit the digital title and transmission form to a first device in the network, wherein the digital title and transmission form is transmitted separately from any portion of the digital object;

wherein the digital title and transmission form includes a request for information regarding the capability of the first device to route at least a portion of the digital object within the network, wherein routing of the at least a portion of the digital object includes transmitting two or more data packets; and wherein the digital title and transmission form is forwardable, separate from any portion of the digital object, by the first device to a second device in the network to request information regarding the capability of the second device to route the at least a portion of the digital object within the network.

20. The apparatus of claim 19, wherein said generating the digital title and transmission form further comprises creating a payload identification value by performing a hashing function on the digital object, wherein the digital title and transmission form comprises the payload identification value.

21. The apparatus of claim 19, wherein said generating the digital title and transmission form further comprises generating the assignee identification value.

22. The apparatus of claim 19, wherein said generating the digital title and transmission form further comprises storing an encryption key associated with the digital object in the digital title and transmission form.

23. The apparatus of claim 19, wherein said generating the digital title and transmission form further comprises storing metadata associated with the digital object in the digital title and transmission form.

24. The apparatus of claim 19, wherein the instructions are further executable to cause the apparatus to forward the at least a portion of the digital object.

25. The apparatus of claim 19, wherein said generating the digital title and transmission form further comprises storing a value representing a file type associated with the digital object in the digital title and transmission form.

26. The apparatus of claim 19, wherein said generating the digital title and transmission form further comprises storing provenance data in the digital title and transmission form.

27. The apparatus of claim 19, wherein said generating the digital title and transmission form further comprises storing a proxy identification value in the digital title and transmission form.

28. An apparatus, comprising:
means for creating a digital title and transmission form for a particular digital object to be routed to a destination through a network, wherein the digital title and transmission form is wholly separate from any portion of the particular digital object and includes information identifying the particular digital object, and wherein the digital title and transmission form includes an assignee identification value that identifies an entity having one or more rights associated with the particular digital object; and means for transmitting the digital title and transmission form to a first device in the network, wherein the digital title and transmission form is transmitted separately from any portion of the particular digital object;

wherein the digital title and transmission form includes a request for information regarding the capability of the first device to route at least a portion of the particular digital object within the network, wherein a transmission of the at least a portion of the particular digital object comprises two or more data packets; and wherein the digital title and transmission form is forwardable, separate from any portion of the particular digital object, by the first device to a second device in the network to request information regarding the capability of the second device to route the at least a portion of the particular digital object within the network.

29. A method, comprising:

receiving, at a first network device within a network, a digital title and transmission form for a particular digital object to be routed via a network, wherein the received digital title and transmission form is wholly separate from any portion of the particular digital object, includes information identifying the particular digital object, includes an assignee identification value that identifies an entity to which one or more rights associated with the particular digital object are assigned, and includes one or more specifications relating to routing of the particular digital object within the network, and wherein the first network device comprises a processor and a memory;

the first network device providing the received digital title and transmission form to one or more other devices in the network; and the first network device receiving linking information from at least one of the one or more other devices in the network, wherein the linking information is generated by the at least one other device in response to receiving the provided digital title and transmission form, wherein the linking information includes information regarding the capability of at least one of the one or more other devices to meet the specifications included in the digital title and transmission form, wherein the linking information is usable by the first network device to forward at least a portion of the particular digital object, and wherein forwarding of the at least a portion of the particular digital object includes transmitting two or more data packets.

30. The method of claim 29, further comprising:

the first network device receiving the at least a portion of the particular digital object; and the first network device routing the at least a portion of the particular digital object based at least in part on the received linking information.

31. The method of claim 30, further comprising decrypting the at least a portion of the particular digital object using an encryption key comprised in the digital title and transmission form.

32. The method of claim 30, wherein the particular digital object is of a sufficient size that it is incapable of being routed in a single Internet Protocol packet.

33. The method of claim 29, wherein the digital title and transmission form is received at the first network device in order to route the particular digital object from a source node to a destination node within the network, wherein the particular digital object is routed from the source node to the destination node without any portion of the particular digital object being routed by the first network device.

34. A non-transitory computer-readable medium having instructions stored thereon that are executable by a network device including a processor and a memory to cause the network device to perform operations that include:

receiving a digital title and transmission form for a first digital object to be transmitted via a network, wherein the digital title and transmission form is wholly separate from any portion of the first digital object, includes information identifying the first digital object, includes an assignee identification value that identifies an entity having one or more rights associated with the first digital object, and includes one or more specifications relating to transmission of the first digital object within the network;

providing the digital title and transmission form to one or more other network devices; and responsive to said providing the digital title and transmission form, receiving linking information from at least one of the one or more other network devices, wherein the linking information includes information regarding the capability of at least one of the one or more other devices to meet the specifications included in the digital title and transmission form, wherein the linking information is usable to transmit at least a portion of the first digital object within the network, and wherein a transmission of the at least a portion of the first digital object comprises two or more data packets.

35. The computer-readable medium of claim 34, wherein the operations further include:

receiving the at least a portion of the first digital object; and transmitting the at least a portion of the first digital object within the network based at least in part on the received linking information, wherein said transmitting includes transmitting two or more Internet Protocol data packets.

36. The computer-readable medium of claim 35, wherein the operations further include decrypting the at least a portion of the first digital object using an encryption key contained in the digital title and transmission form.

37. The computer-readable medium of claim 35, wherein the one or more rights associated with the first digital object include a right to decrypt the at least a portion of the first digital object.

38. The computer-readable medium of claim 34, wherein the linking information is usable to route the at least a portion of the first digital object in the event that the network device receives the at least a portion of the first digital object, wherein the digital title and transmission form includes quality of service information.

39. An apparatus, comprising:

a processor; and a memory medium coupled to the processor, wherein the memory medium stores program instructions executable by the apparatus to:

receive a digital title and transmission form for a digital object, wherein the digital title and transmission form is wholly separate from any portion of the digital object, includes information identifying the digital object, includes an assignee identification value that identifies an entity having one or more rights associated with the digital object, and includes one or more specifications relating to routing of the digital object within the network;

provide the digital title and transmission form to one or more other network devices; and responsive to said providing the digital title and transmission form, receive linking information from at least one of the one or more other network devices, wherein the linking information includes information regarding the capability of at least one of the one or more other devices to meet the specifications included in the digital title and transmission form, wherein the linking information is usable to route at least a portion of the digital object within the network, and wherein a transmission of the at least a portion of the digital object includes two or more data packets.

40. The apparatus of claim 39, wherein the program instructions are further executable to:
  receive the at least a portion of the digital object; and
  route the at least a portion of the digital object within the network based at least in part on the received linking information.

41. The apparatus of claim 40, wherein the program instructions are further executable to decrypt the at least a portion of the digital object using an encryption key contained in the digital title and transmission form.

42. The apparatus of claim 40, wherein routing the at least a portion of the digital object includes using two or more Internet Protocol packets for payload data of the digital object.

43. The apparatus of claim 39, wherein the linking information is usable to route the at least a portion of the digital object in the event that the apparatus subsequently receives the at least a portion of the digital object, wherein the digital title and transmission form includes quality of service information.

44. An apparatus, comprising:
  a processor and a network interface configured to couple to a network, wherein the interface is configured to receive a digital title and transmission form for a particular digital object, wherein the digital title and transmission form is wholly separate from any portion of the particular digital object, includes information identifying the particular digital object, includes an assignee identification value that identifies an entity having one or more rights associated with the particular digital object, and includes one or more specifications relating to routing of the particular digital object within the network, and wherein the network interface is further configured to subsequently receive at least a portion of the particular digital object;
  means for providing the digital title and transmission form to one or more network devices, wherein the apparatus is configured to receive linking information from at least one of the one or more network devices, wherein the linking information is generated responsive to receipt of the digital title and transmission form by the at least one network device, wherein the linking information includes information regarding the capability of at least one of the one or more other devices to meet the specifications included in the digital title and transmission form, and wherein the linking information is usable to route the at least a portion of the particular digital object within the network; and
  means for routing the at least a portion of the particular digital object based at least in part on the received linking information, wherein routing of the at least a portion of the particular digital object includes transmitting two or more data packets.

* * * * *

UNITED STATES PATENT AND TRADEMARK OFFICE
CERTIFICATE OF CORRECTION

PATENT NO. : 8,055,897 B2  
APPLICATION NO. : 11/296601  
DATED : November 8, 2011  
INVENTOR(S) : Khan et al.

Page 1 of 1

It is certified that error appears in the above-identified patent and that said Letters Patent is hereby corrected as shown below:

Title Page 3, item (56), under "Foreign Patent Documents", in Column 1, Lines 1-13, delete
"JP    2001-077856    3/2001  
JP    2001-282619    10/2001  
JP    2002-261800    9/2002  
JP    2002-261805    9/2002  
JP    2003-122726    4/2003  
JP    2003-209568    7/2003  
JP    2004-140486    5/2004  
JP    2004-159296    6/2004  
JP    2004-266547    9/2004  
JP    2004-341929    12/2004  
JP    2005-150955    6/2005  
JP    2005-222523    8/2005  
KR    2000-4564    1/2000"  
and insert  
--JP    2001-077856    3/2001  
JP    2002-261800    9/2002  
JP    2002-261805    9/2002  
JP    2003-209568    7/2003  
JP    2004-140486    5/2004  
JP    2004-159296    6/2004  
JP    2004-266547    9/2004  
JP    2004-341929    12/2004  
JP    2005-150955    6/2005  
KR    2000-4564    1/2000--.

Signed and Sealed this  
Thirty-first Day of July, 2012

David J. Kappos  
*Director of the United States Patent and Trademark Office*